UNITED STATES PATENT OFFICE.

JAMES B. TURNER, OF CHICAGO, ILLINOIS.

METHOD OF MAKING ARTIFICIAL MARBLE.

1,079,077.　　　Specification of Letters Patent.　　Patented Nov. 18, 1913.

No Drawing.　　Application filed December 13, 1912.　Serial No. 736,552.

*To all whom it may concern:*

Be it known that I, JAMES B. TURNER, a citizen of the United States, and a resident of the city of Chicago, county of Cook, and State of Illinois, have invented certain new and useful Improvements in Methods of Making Artificial Marble, of which the following is a specification.

My invention relates to improvements in methods of making artificial marble and has for its object the provision of an improved method for this purpose, which is simple, economical, and highly efficient in use.

The invention consists in the method of procedure hereinafter described and claimed.

The preferred method of procedure consists in first forming or casting the desired body in any desired form, of double-burned gypsum cement such as Keene's cement, and then treating the surface of said body with a saturated solution of sulfate of potassium. The body is then set aside and exposed to the air for eight or ten days when it is ready for polishing in the usual manner, and will be found to be capable of readily receiving a high polish so that it cannot easily be distinguished from genuine marble.

While I have set forth in detail the preferred method of procedure, the same is capable of variation and modification without departing from the spirit of my invention. I, therefore, do not wish to be limited to the exact steps set forth in detail, but desire to avail myself of such variations and modifications as fall within the scope of the appended claims.

Having described my invention what I claim as new and desire to secure by Letters Patent is:

1. The method of making artificial marble which consists in forming a body from double-burned gypsum cement and then treating the surface of said body with a solution of potassium sulfate, substantially as described.

2. The method of making artificial marble which consists in forming a body from double-burned gypsum cement and then treating the surface of said body with a saturated solution of potassium sulfate, substantially as described.

3. The method of making artificial marble which consists in forming a body from double-burned gypsum cement, then treating the surface of said body with a saturated solution of potassium sulfate, and then exposing the body to the action of air for a number of days, substantially as described.

In testimony whereof I have signed my name to this specification in the presence of two subscribing witnesses.

JAMES B. TURNER.

Witnesses:
　JOSHUA R. H. POTTS,
　HELEN F. LILLIS.